United States Patent [19]

Antoine et al.

[11] 4,090,869

[45] May 23, 1978

[54] PROCESS OF MANUFACTURING ALLOY STEELS IN A CONTINUOUSLY CHARGED ARC FURNACE

[76] Inventors: Lucien Antoine, Parc Dorian, 42490 Fraisses; Pierre Leroy, 23 rue de Tourville, 78100 Saint-Germain-en-Laye; Jean Saleil, 11 rue Lougansk, 42100 Saint-Etienne, all of France

[21] Appl. No.: 774,606

[22] Filed: Mar. 4, 1977

[30] Foreign Application Priority Data

Apr. 7, 1976  France .................................. 76 10062

[51] Int. Cl.$^2$ .............................................. C21C 5/52
[52] U.S. Cl. ...................................... 75/12; 75/130.5
[58] Field of Search ..................... 75/11, 12, 49, 130.5

[56] References Cited

U.S. PATENT DOCUMENTS

| | | | |
|---|---|---|---|
| 3,012,875 | 12/1961 | Senior | 75/130.5 |
| 3,158,464 | 11/1964 | Chynoweth | 75/130.5 |
| 3,198,624 | 8/1965 | Bell | 75/130.5 |
| 3,556,770 | 1/1971 | Post | 75/12 |

*Primary Examiner*—Peter D. Rosenberg
*Attorney, Agent, or Firm*—Haseltine, Lake & Waters

[57] ABSTRACT

In a process of manufacturing an alloy steel, particularly stainless steel, in an electric arc furnace, in a first stage the furnace charge is brought to a molten state, in a second stage ferro-alloy in divided form is continuously supplied to the molten charge and simultaneously a refining fluid is blown into the charge, and in a third stage the molten charge is decarburized, if necessary, to give the required carbon content, and chromium oxide in the slag is reduced.

9 Claims, No Drawings

PROCESS OF MANUFACTURING ALLOY STEELS IN A CONTINUOUSLY CHARGED ARC FURNACE

The present invention is concerned with the manufacture of alloy steels in electric arc furnaces provided with systems for continuously introducing solid materials and fluids.

It is common practice to charge an arc furnace with solid materials, in granule or pellet form, through the roof of the furnace, these materials being melted by the heat of the arcs and then refined. This way of utilizing the furnace has two disadvantages which are that the operating period is long because a refining stage has to be carried out after the melting stage, and a relatively large amount of electrical energy is consumed.

The process in accordance with the present invention is carried out in an electric arc furnace which is continuously charged with solid material in granular, pellet or other finely divided form, consisting in the main of carburized or uncarburized ferro-alloys, with or without the addition of pig iron or pre-reduced products. It is an object of the present invention to carry out simultaneously and continuously the charging of the furnace and the melting and refining of the solid material during the major part of a discontinuous process, to produce either an intermediate product which will be subject to further refining in a ladle, possibly under vacuum, or in a converter, or a final product having the required composition and not requiring further refining. As a result, a very wide range of solid materials can be used, extending the range of materials traditionally used for charging an electric furnace.

According to the invention there is provided a process for manufacturing an alloy steel, especially a chrome and manganese steel, and more especially a stainless steel, from granulated and carburized or uncarburized ferro-alloy, such as ferro-chromium, ferro-manganese and ferro-nickel, with or without the addition of pig iron or pre-reduced materials in granule or pellet form, in an electric arc furnace which includes means for continuously charging the furance with solid materials in granule, pellet or other finely divided form, and means for injecting refining fluids, such as oxygen or air, enriched or not, with or without powdered lime, water vapor or neutral gases into the furnace, said fluid-injection means comprising lances or tuyeres, said process comprising:

in a first stage, bringing the initial alloyed or unalloyed charge to the molten state;

in a second stage continuously adding the carburized or uncarburized ferro-alloy to the molten charge, with or without other solid materials in fragmented, granular or pellet form, while simultaneously blowing refining fluid into the charge, the kind of fluid and the flow rate thereof being controlled, in relation to the power of the arcs, such that throughout said second stage the molten charge has an optimum carbon content and remains at a substantially constant temperature, and the amount of oxidized chromium passing into the slag at any time during said second stage is directly related to said optimum carbon content and said temperature; and in a third and final stage, decarburizing, if necessary, the molten charge to give the required carbon content, and then reducing the chromium oxide in the slag with ferro-silicon or other reducing agents, in the presence of lime, a neutral gas being blown into the charge through the tuyeres or lances to produce a mixing action.

During said third stage, a neutral or reducing gas is preferably blown through the lances or tuyeres, the gas carrying finely divided materials such as carbon, nickel and alloying elements, possibly in the form of easily reduced oxides, said materials contributing to finalizing the required composition of the alloy steel.

It will be understood that an important advantage of use of the present invention is that it provides simultaneous melting and refining of continuously charged materials, especially ferro-alloys, in accordance with an optimum development of the carbon content of the molten charge, following a programme drawn up in advance, and with the least possible departure from a selected temperature. All this is achieved during the second stage of the process. The process is still a discontinuous one, however, because of its first and third stages. The first stage consists in melting down an initial charge, and the third and final stage consists in oxidizing the residual carbon of the second stage and adjusting the levels of the various constituents, to obtain the required composition of the steel to be run off into a ladle.

In the second stage, the fact that melting and refining are carried out simultaneously, by the simultaneous action of the electric arcs and the injected fluids, and continuously, like the charging, means that the mean carbon content of the molten charge can be readily controlled. For example, it can be held at an optimum value which may be constant for a greater or longer period, or which may follow a predetermined curve. The process also enables the mean temperature of the molten charge to be controlled, so that it can be kept practically constant throughout the second stage. The operator has simultaneous control over the flow rates of the solid materials, the kinds and flow rates of the refining fluids, and the power dissipated in the electric arcs.

Another advantage of the process is that, due to the techniques of continuously charging the furnace and injecting the refining fluids, the melting and refining zones can be distinct from one another. The former is situated at the interface of the solid material and the molten charge, and the latter is situated in the molten charge, opposite the lances or tuyeres.

Thus the chromium content in the refining zones remains for a long time very much lower than the final required value, so that decarburization occurs progressively in the presence of a chromium content which, although increasing with time, is below the required final value. This is the result of the progressive dilution of the molten material which is charged with chromium and carbon in a molten charge which has a lower carbon content and a much lower chromium content, except during the final moments of the second stage.

Another, and more general, advantage of the process is that the chemical reactions involved in refining the molten charge continuously produce heat, which is partially used to melt the solid materials, which means that the electric power consumption of the furnace can be significantly reduced and its productivity increased.

The invention will be more fully understood from the following description of an embodiment of the process in accordance with the invention, given by way of example only, the embodiment being concerned with the manufacture of austenitic stainless steel.

The electric arc furnace has a capacity of 90 tons, and, in the center of its roof, is provided with an aperture over which is located a system for continuously charging the furnace with solid materials. To one side, slightly above the hearth, the furnace is provided with three tuyeres, each consisting of two concentric tubes protected by fuel oil.

In the first stage of the process, the furnace is charged with 22 tons of unalloyed scrap iron and 1 800 kilograms of carburized ferro-manganese, containing 75% manganese and 7.5% carbon. This initial charge is melted down with the electric arcs, and brought to a temperature of 1,580° C.

During the second stage which lasts 34 minutes, the furnace is continuously charged, through the central opening in its roof, with 470 kg/min of carburized ferro-chromium containing 52% chromium, 7.5% carbon, 2.5% silicon, and with 530 kg/min of carburized ferro-nickel containing 23% nickel, 1.8% carbon, 2.7% silicon, 1.8% chromium.

At the same time, the three fuel oil-protected tuyeres are used to inject 70 Nm$^3$/min of pure oxygen containing 1.2 kg of powdered lime per cubic meter of oxygen, so that the flow rate of the powdered lime is 84 kg/min. The flow rate of the protective fuel oil is 0.8 liter per minute for each tuyere.

The electrical power dissipation is controlled to maintain the temperature of the molten charge at around 1,580° C, due account being taken of the heat released by the refining reactions, and the heat required to melt the added solid material.

The carbon content of the molten charge is set at about 0.200% at the start of the second stage, i.e. when the chromium content is very low, and is controlled so that it progressively increases during the second stage so that when the chromium content reaches 18.2% the carbon content is 0.800%.

At this point the continuous charging of solid materials is stopped.

The third and final stage begins with a brief decarburization, by means of oxygen and water vapour blown in through the tuyeres. At the end of the decarburisation process, the carbon content is 0.550%, the chromium content is 17.3%, and the nickel content is 9.7%, the temperature of the molten charge being 1 610° C. The amount of $Cr_2O_3$ in the slag is 19%. The third stage is terminated by reducing the chromium oxide in the slag by adding ferro-silicon and lime, a neutral gas being blown in through the tuyeres to produce a mixing action.

The chromium content of the molten charge rises to 19.5%, the amount of the other constituents remaining unchanged.

The refined metal is run off into a ladle for final processing in the ladle, under vacuum and with pure oxygen being blown in through a lance, or in a bottom-blown converter, using a gas for diluting the carbon oxides, the end result being a carbon content of less than 0.030% and chromium and nickel contents of 19% and 9.5%, respectively.

The refining can also be finished off in the furnace, and the running off of the molten metal into the ladle need not necessarily be under vacuum.

Generally speaking, the above described process is especially suited to the manufacture of ferritic and austenitic chrome steels and manganese steels, i.e. to stainless steels in general.

It will be understood that the process may be modified and improved in matters of detail, and that equivalent means may be used, without departing from the scope of the invention as defined by the appendant claims.

What is claimed is:

1. A process of manufacturing an alloy steel, selected from the group consisting of chrome steels and manganese steels from a granulated ferro-alloy in an electric arc furnace provided with means for continuously charging the furnace with solid materials in divided form and means for injecting a refining fluid into the furnace, said process comprising;
   in a first stage, bringing the initial charge to the molten state;
   in a second stage, continuously adding the ferro-alloy to the molten charge while simultaneously blowing the refining fluid into the charge, the kind of refining fluid and the flow rate thereof being controlled in relation to the power of the arcs such that, throughout said second stage, the molten charge has an optimum carbon content and remains at a substantially constant temperature, the amount of oxidized chromium passing into the slag at any time during said second stage being directly related to said optimum carbon content and said temperature; and
   in a third and final stage, decarburizing, if required, the molten charge to give the required carbon content, and reducing chromium oxide in the slag with a reducing agent in the presence of lime, a neutral gas being blown into the charge through the refining fluid injecting means to produce a mixing action wherein at least the first two stages are carried out in the electric arc furnace.

2. A process according to claim 1, including during said third stage, blowing a neutral or reducing gas through the refining fluid injecting means, carrying finely divided materials, such as carbon, nickel and alloying elements, possibly in the form of easily reduced oxides, said materials contributing to finalizing the required composition of the alloy steel.

3. A process according to claim 1, wherein the ferro-alloy is selected from the group comprising ferro-chromium, ferro-manganese and ferro-nickel.

4. A process according to claim 1, wherein the ferro-alloy is carburized.

5. A process according to claim 1, wherein the ferro-alloy is uncarburized.

6. A process according to claim 1, wherein a material selected from the group comprising pig iron and pre-reduced materials in the form of granules or pellets, is added with the ferro-alloy in the second stage.

7. A process according to claim 1, wherein the refining fluid is selected from the group consisting of oxygen and air which may be enriched, with or without powdered lime, water vapor or a neutral gas.

8. A process according to claim 1, wherein the reducing agent is ferro-silicon.

9. A process according to claim 1, wherein the refining gas is blown into the charge through tuyeres or lances.

* * * * *